July 7, 1970  C. G. LINKFIELD  3,519,037

SAW CHAIN DRIVING APPARATUS

Filed June 14, 1967  2 Sheets-Sheet 1

CHESTER G. LINKFIELD
INVENTOR

BY
BUCKHORN, BLORE, KLARQUIST & SPARKMAN
ATTORNEYS

July 7, 1970
C. G. LINKFIELD
3,519,037
SAW CHAIN DRIVING APPARATUS
Filed June 14, 1967
2 Sheets-Sheet 2
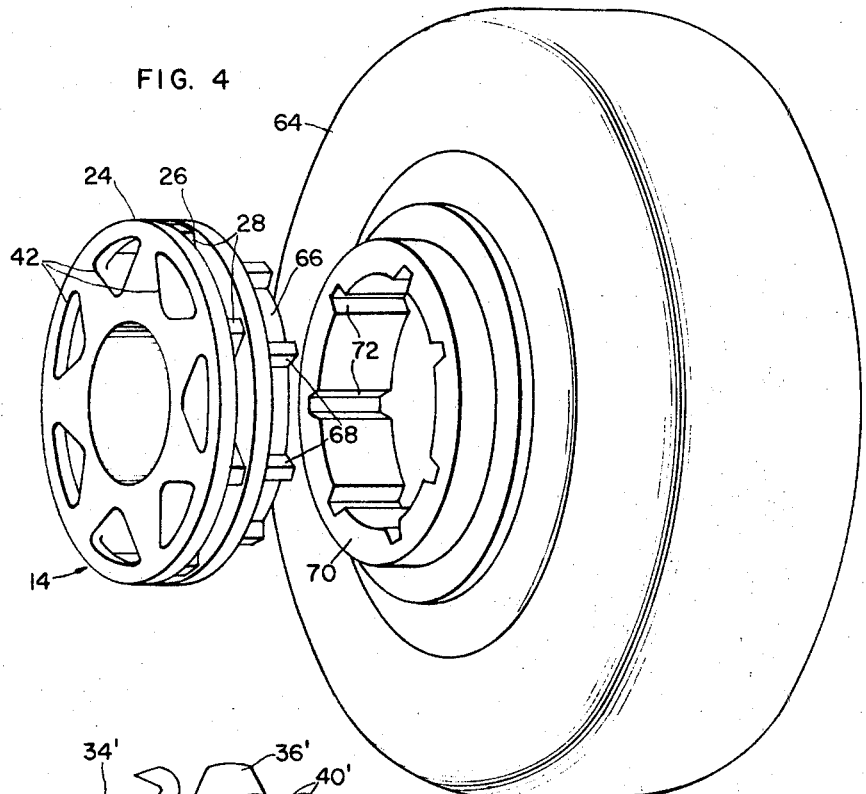
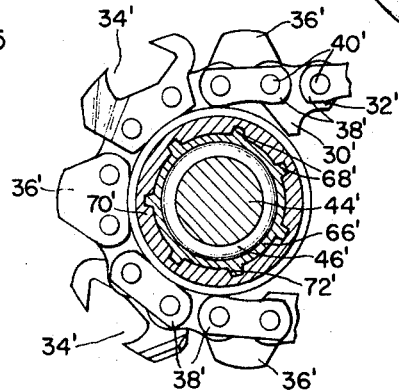
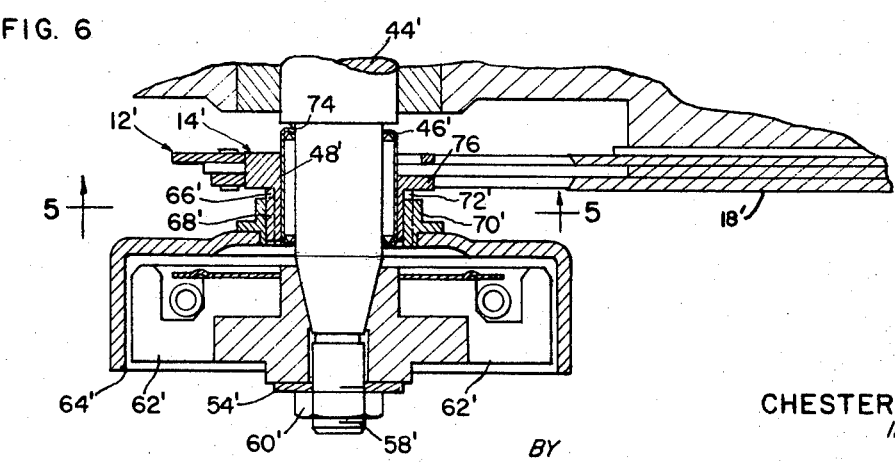
CHESTER G. LINKFIELD
INVENTOR
BY
BUCKHORN, BLORE, KLARQUIST & SPARKMAN
ATTORNEYS

United States Patent Office 3,519,037
Patented July 7, 1970

3,519,037
SAW CHAIN DRIVING APPARATUS
Chester G. Linkfield, Lighthouse Point, Fla., assignor to Omark Industries, Inc., Portland, Oreg., a corporation of Oregon
Filed June 14, 1967, Ser. No. 646,054
Int. Cl. B27b *17/08*
U.S. Cl. 143—32
10 Claims

ABSTRACT OF THE DISCLOSURE

A drive for the saw chain of a chain saw is provided with a sprocket journaled upon the saw's drive shaft. The sprocket includes an end hub for carrying a clutch drum also positioned coaxially with respect to the drive shaft. The sprocket hub is formed with male splines, and the clutch drum is formed with female splines so that a slidable coaxial connection is established therebetween permitting free axial movement of the sprocket.

BACKGROUND OF THE INVENTION

Sprockets for chain saws may be mounted directly on a saw's drive shaft. However, it is desirable to employ sprockets which have disc portions supporting the side links of the saw chain, and misalignment or side movement of the driven chain with respect to the sprocket is likely in this event to cause injurious wear. Another type of sprocket arrangement is available wherein slidable movement between the sprocket and the drive shaft is permitted. In the usual construction of this type, a clutch is mounted coaxially with respect to the drive shaft and the sprocket is in turn carried by the clutch. For example, the clutch drum may be provided with an externally splined hub matching internal sprocket splines. The sprocket will rotate with the clutch drum, but can move axially to accommodate any misalignment of the chain. The sprocket is thus journaled for rotation upon a splined surface. However, the sprocket mounted in this way upon splines is liable to wobble and vibrate unnecessarily causing causing wear of moving parts. Also, since the sprocket is received over the outside of the splined hub, the sprocket is limited in the radial space it may occupy and is especially unsuitable for the construction of smaller saws.

SUMMARY OF THE INVENTION

According to the present invention, a saw chain sprocket is provided with a central bearing for journaling said sprocket on a shaft to prevent wobble of the sprocket and provide a radially large sprocket. The sprocket is also slidably connected to a clutch drum or similar drive means located along the shaft such that the sprocket can slide along the shaft.

In accordance with preferred embodiments of the present invention, a sprocket, journaled to a drive shaft, is provided with an axially extending end hub having male outer splines. This hub in turn carries the drum of a clutch, such drum being provided with matching female splines so that the sprocket is slidable with respect to the drum and is not axially restrained by the drum. The clutch drum is powered through a clutch mechanism which causes the drum to rotate. The sprocket is then driven on its shaft by means of the splined interconnection.

It is an object of the present invention to provide an improved driving apparatus for a saw chain which is capable of improved accommodation and self-adjustment.

It is another object of the present invention to provide improved sprocket mechanism for a saw chain wherein the sprocket is permitted to float axially for accommodation and self-adjustment with respect to movement of the saw chain, while still maintaining accurate rotation in a predetermined plane, or planes, with respect to a predetermined sprocket axis.

It is a further object of the present invention to provide an improved saw chain sprocket of increased radial size and capable in its operation of decreasing overall wear in saw chain moving parts.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 4 is an exploded perspective view of a sprocket and clutch drum employed according to the construction of the present invention;

FIG. 5 is a vertical cross-sectional view of a second embodiment of a saw chain apparatus according to the present invention; and FIG. 6 is a horizontal cross section of the FIG. 5 apparatus.

DETAILED DESCRIPTION

Figure 1:
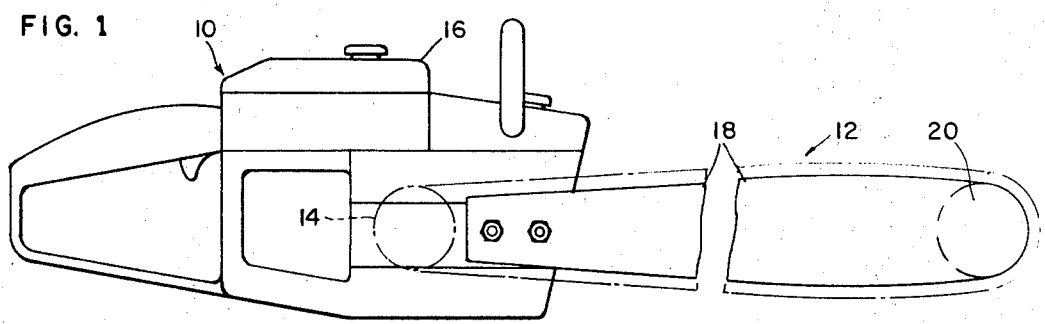
FIG. 1 is a fragmentary side elevation view of a chain saw employing driving apparatus according to the present invention.

Referring to the drawings and in particular, FIG. 1 there is illustrated a chain saw 10 having a saw chain mounted thereon which is diagrammatically indicated at 12. The saw chain also has a drive sprocket indicated at 14 driven from a motor, an internal combustion engine, or the like, 16. The chain saw also includes a saw bar 18 having a roller nose 20, with such saw bar being peripherally grooved to receive saw chain 12.

Figure 2:
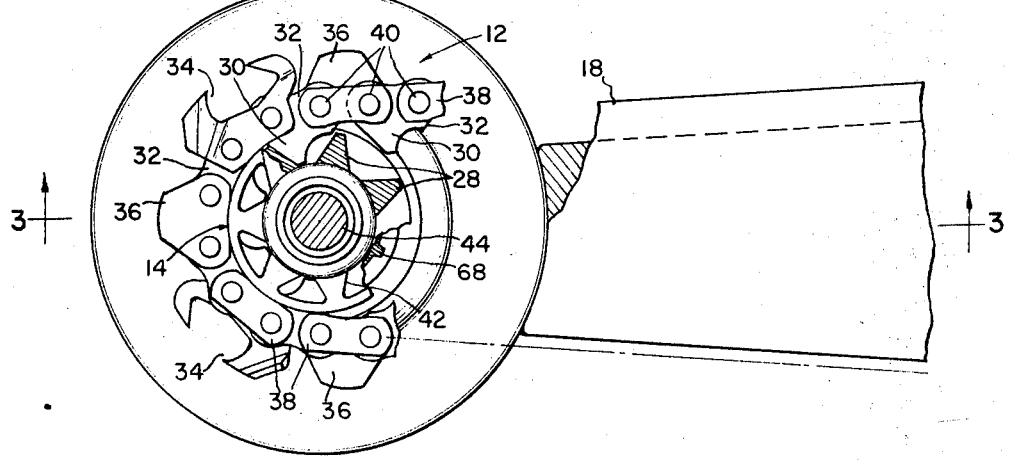
FIG. 2 is a side view, partially in vertical cross section, of one form of a saw chain driving apparatus according to the present invention.
Figure 3:
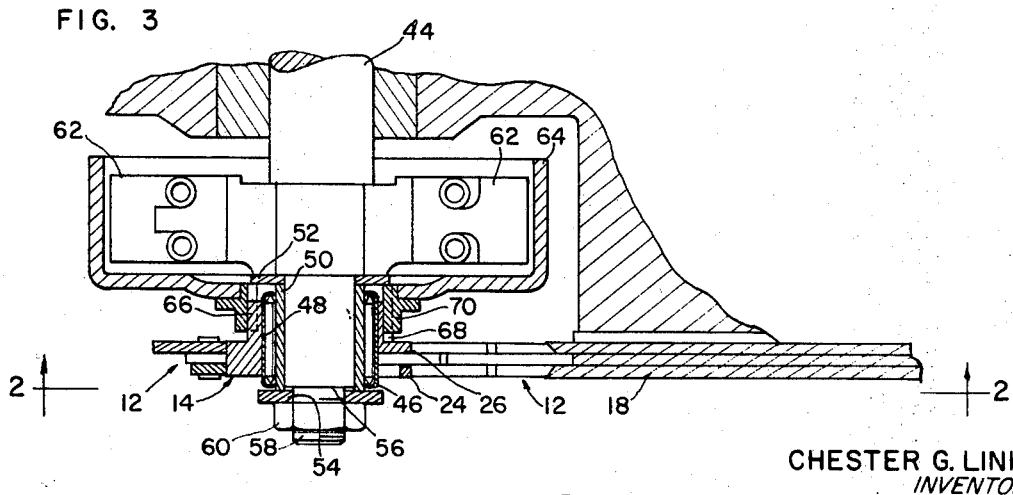
FIG. 3 is a horizontal cross section of the FIG. 2 apparatus taken at 3—3.

Driving apparatus according to the present invention, more particularly illustrated in FIGS. 2, 3 and 4, includes a sprocket 14 of the type comprising a pair of equal-diameter aligned discs 24 and 26 separated by sprocket teeth 28 located between the discs. The sprocket teeth 28 are adapted to engage tangs 30 of center drive links 32 forming a part of the chain 12. The outer peripheral rims of discs 24 and 26 are adapted to carry the side links which form a part of the saw chain, such side links here comprising cutter links 34, guard links 36 and tie links 38. The side links are joined to the center drive links 32 by means of rivets 40. The sprocket is also provided with apertures 42 in disc 24 within the rim periphery thereof and extending axially of the sprocket in the direction, for example, away from the body and motor of the chain saw. These apertures provide for discharge of wood chips, sawdust and various foreign matter which might otherwise be impacted between the teeth 28 during operation of the chain saw.

The sprocket is coaxially mounted on the end of drive shaft 44 extending from the motor or other source of power. The sprocket is axially provided with a central needle-bearing member 46 which may be secured within the central bore 48 of the sprocket and which is rotatable about sleeve 50 slidably received upon the end of drive shaft 44. The sleeve 50 thus suitably forms the inner race for the bearing. The sleeve 50 is secured on the end of shaft 44 between a retaining washer 52 abutting a shoulder on an enlarged portion of shaft 44 toward the driven end thereof, and a second retaining washer 54 positioned in front of the forward shoulder 56 on the forward end of the drive shaft. The drive shaft in front of shoulder 56 is smaller in diameter and threaded at 58 to receive a nut 60 retaining washer 54 against sleeve 50.

As more clearly illustrated in FIG. 3, sprocket 14 and bearing member 46 are shorter in their axial extent along the shaft than sleeve 50. In a usual construction, the sprocket 14 can move along sleeve 50 a distance approximately equal to the difference between the length of sleeve 50 and that of bearing member 46. This movement permits self-accommodating alignment of the sprocket with respect to chain 12 extending from grooved saw bar 18. However, the sprocket is prevented from wobbling because of being journaled by means of bearing member 46 upon sleeve 50 located upon shaft 44.

Shaft 44 is operatively connected to a clutch mechanism, suitably a centrifugal clutch operative when a certain drive shaft speed is attained. The shaft 44 rotates clutch shoes 62 within a clutch drum 64 and when the predetermined speed is reached, these shoes engage the interior surface of the drum causing such drum to rotate. The construction and operation of this type of clutch are conventional and will not be described in detail.

The clutch drum is not directly carried upon the shaft, but is instead carried upon sprocket 14. This construction is most clearly illustrated in the exploded perspective view of FIG. 4. Sprocket 14 is provided with an axially-extending end hub 66 carrying male splines 68 around the periphery thereof, while clutch drum 64 is provided with a central hub portion 70 slidable over hub 66. Hub portion 70 includes female splines 72 which fit over male splines 68 in keyed engaging relation so as to rotatably secure sprocket 14 and drum 64 while permitting relative axial movement between the two parts. When the clutch shoes 62 engage drum 64, the drum 64 rotatably drives sprocket 14 through the matching splines. However, this driving connection does not restrain the axial movement of the sprocket 14 except between predetermined limits as set between retaining washers 52 and 54. The hub portion 70 of clutch drum 64 also limits movement of sprocket 14 in a direction along the drive shaft toward the drive motor, particularly in cases where the dimensions of portion 70 are such that it extends further toward the sprocket than bearing member 46 extends toward washer 52, when hub 66 and hub portion 70 are closest to washer 52. Hub portion 70 is restrained from movement in that direction by means of washer 52.

The present invention has a number of advantages over the prior art, including the prevention of wobble of the sprocket, since the sprocket is accurately journaled on the drive shaft through intermediate bearing means. Also, the radial dimension of the sprocket 14 between its bearing and outer or rim periphery thereof is the maximum allowable for a given size shaft and a given chain course design, and is not restricted in radial extent because of the introduction of another splined drive member between the shaft and the interior of the sprocket. Therefore, the sprocket according to the present invention can be produced in smaller sizes and is suitably employed on smaller saws driving smaller chain without being unduly fragile in construction. For a sprocket having a given number of teeth, e.g. seven according to one preferred design, a smaller pitch chain can be more readily accommodated. The present sprocket construction has greater mechanical strength since it employs a substantially solid central hub portion accommodated immediately around a shaft. Moreover, the apertures 42 in the present drive sprocket construction provide more effective discharge of chips from notches between sprocket teeth than prior construction inasmuch as in the prior construction there is more opportunity for entrainment of material between sprocket teeth and splined surfaces.

A second embodiment of the present invention is illustrated in FIGS. 5 and 6 wherein similar elements are referred to with primed reference numerals. In FIGS. 5 and 6 embodiment, the sprocket 14' is located between clutch drum 64' and the driven end of shaft 44' extending from the motor. This construction is useful for saws wherein saw bar 18' is located closer to the drive motor. The construction and operation of the FIGS. 5 and 6 embodiment is similar to the previous embodiment except that axial movement of sprocket 14' including needle bearing member 46' is restrained between shoulder 74 of drive shaft 44' and hub portion 70' of clutch drum 64'. The bearing member 46' can move no farther than the shoulder 74, while the outer portion of disc 76, forming a part of sprocket 14', can move no further than the farthest inwardly extending axial portion of hub portion 70'.

Since, in the embodiment of FIGS. 5 and 6, the clutch mechanism is located on the opposite side of the sprocket from the motor, the sprocket hub 66' including male splines 68' conveniently extends outwardly along the drive shaft 44'. Hub portion 70' including female splines 72' extends inwardly, with hub portion 70' being carried by sprocket hub 66'. The splined construction is clearly seen in the FIG. 5 cross section. The perspective view of FIG. 4 is also illustrative of the second embodiment since the drum and sprocket elements are substantially similar in both embodiments.

As in the previous embodiment, the sprocket is aligned for accurate rotation upon shaft 44' by means of needle-bearing members 46', while being free to move axially along shaft 44' within predetermined limits. Thus, the sprockets 14' can properly align itself with respect to saw chain 12' without wobble of the sprocket. Also, since the sprocket turns directly on the drive shaft, it is stronger and can be made in smaller sizes without being unduly fragile. The other advantages of the previous embodiment are also attained.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. Driving apparatus for a saw chain comprising:
   a central shaft and a chain driving sprocket which is substantially coaxial with said shaft,
   clutch drive means also located substantially coaxially with respect to said shaft for rotatably driving said sprocket,
   a keyed connection between said clutch drive means and said sprocket constraining such clutch drive means and sprocket for substantially simultaneous rotation, said connection being free of axial restraint within predetermined limits so that said sprocket is free to float within such limits axially on said central bearing with respect to said shaft,
   said sprocket being provided with a central bearing separate from the keyed connection for journaling said sprocket on said shaft, said sprocket being slideable on said shaft.
2. The apparatus according to claim 1 including retaining means limiting the axial movement of said sprocket in the axial direction along said shaft.
3. Driving apparatus for a saw chain comprising:
   a drive shaft adapted to be motor driven,
   a chain-driving sprocket which is substantially coaxial with said shaft and which is provided with an axial bearing for journaling said sprocket on said shaft,
   clutch means also located coaxially with respect to said shaft and adapted to be driven by said shaft,
   said sprocket being provided with a hub extending axially along said shaft, said hub having a splined connection with said clutch means for providing mu- tual rotation while permitting slideable movement therebetween, and means limiting the axial movement of said sprocket on said axial bearing to a predetermined distance.

4. The apparatus according to claim 3 further including a drive motor adapted for mounting on a chain saw and from which said drive shaft extends, said chain-driving sprocket being located coaxially with respect to said drive shaft on the remote side of said motor from said clutch means.

5. The apparatus according to claim 3 including a drive motor adapted for mounting on a chain saw and from which said drive shaft extends, said clutch means including a clutch drum which is located coaxially with respect to said shaft on the remote side of said chain-driving sprocket from said drive motor.

6. The apparatus according to claim 3 wherein said sprocket is provided with external splines on the hub thereof, said clutch means including a clutch drum having a hub portion within which the sprocket hub is received and provided with internal splines matching the splines on said sprocket hub for providing an axially sliding connection between said clutch drum and said sprocket.

7. The apparatus according to claim 3 wherein said means limiting the axial movement of said sprocket comprises retaining means positioned along said drive shaft at axially spaced locations therealong.

8. The apparatus according to claim 7 wherein a sleeve is received upon said drive shaft between said retaining means, and wherein said sprocket bearing comprises a needle bearing member secured to said sprocket and slidable along said sleeve, said sleeve forming the inner race for said bearing member.

9. The apparatus according to claim 3 wherein said sprocket comprises a pair of discs having chain-engaging peripheral rims and provided with chain-engaging teeth between said rims, one of said discs having a plurality of apertures inside the peripheral dimension of said disc and between said teeth, said apertures extending axially through said disc to provide discharge of waste material therethrough.

10. The apparatus according to claim 9 further including an edge grooved saw bar aligned with at least one portion of said sprocket and adapted to receive a saw chain being received in driven relation upon such sprocket and along the groove of said saw bar.

References Cited

UNITED STATES PATENTS 1,838,700 12/1931 Meyer _____ 143—32
3,144,890 8/1964 Irgens _____ 143—32

DONALD R. SCHRAN, Primary Examiner

U.S. Cl. X.R.

74—243